Nov. 30, 1926.
B. P. CURRIER ET AL
1,608,725
LENS TESTING INSTRUMENT
Filed Oct. 16, 1922     2 Sheets-Sheet 1
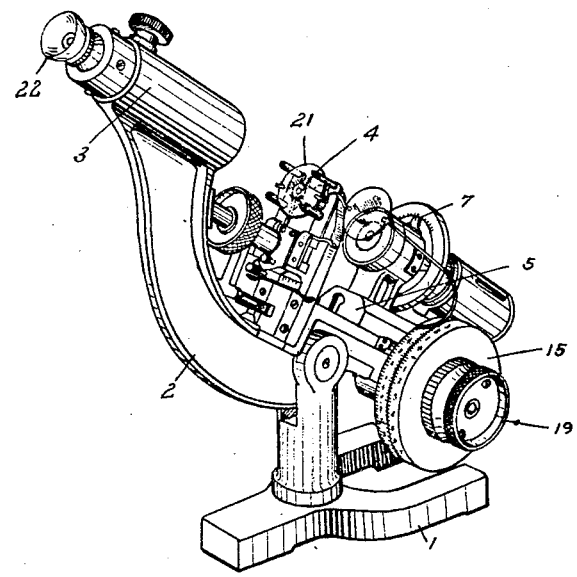
FIG. I
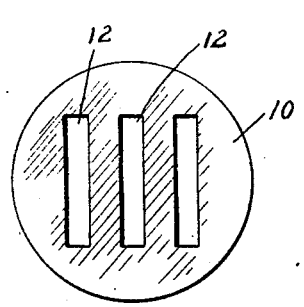
FIG. II
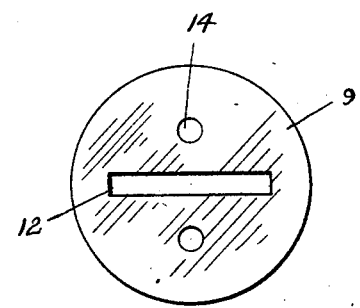
FIG. III
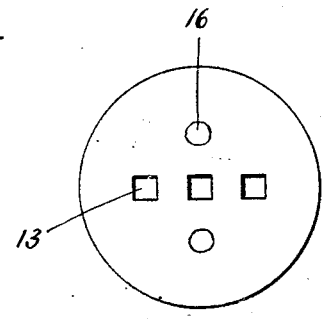
FIG. IV
INVENTOR
E. D. TILLYER
B. P. CURRIER
BY
H. H. Styll & H. H. Parsons
ATTORNEYS Nov. 30, 1926.  1,608,725
B. P. CURRIER ET AL
LENS TESTING INSTRUMENT
Filed Oct. 16, 1922   2 Sheets-Sheet 2
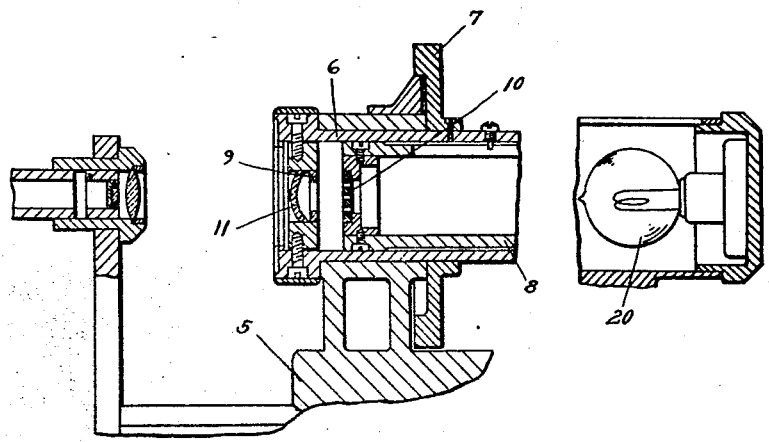
FIG. V
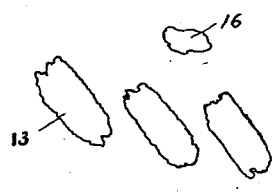
FIG. VI
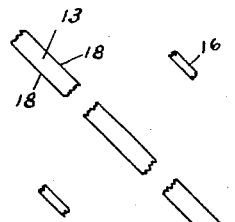
FIG. VIII
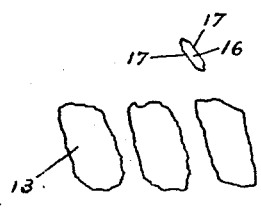
FIG. VII
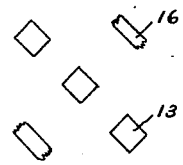
FIG. IX
INVENTOR
E. D. TILLYER
B. P. CURRIER
BY
H. H. Styll  A. H. Parsons
ATTORNEYS Patented Nov. 30, 1926.

1,608,725

UNITED STATES PATENT OFFICE.

BERNARD P. CURRIER AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

Application filed October 16, 1922. Serial No. 594,937.

This invention relates to improvements in lens testing instruments and has particular reference to novel and improved means for facilitating the use of precision lens testing instruments in determining the power and axis of a toric or cylindrical lens.

The principal object of the present invention is the provision of a novel form of target structure for use in connection with an instrument of this character which will enable the power of the lens in one meridian to be quickly and readily determined irrespective of the axial adjustment of the target member.

Other objects and advantages of our improvement should be readily apparent by reference to the following specification taken in connection with the accompanying drawings, and it will be understood that we may make any modifications in the specific details of construction shown and described within the scope of the appended claims without departing from or exceeding the spirit of the invention.

Figure I represents a perspective view of an instrument to which our improvement is applied.

Figure II represents a view of one of the target members.

Figure III represents a view of the other target member.

Figure IV represents a view of the image as seen when the instrument is in zero position in the absence of a lens, or with a spherical lens properly focused.

Figure V is an enlarged fragmentary sectional view of the targets and adjusting mechanism.

Figure VI represents a view of the target image when the entire instrument is out of adjustment.

Figure VII represents a view of the image with the instrument properly focused in one meridian for off axis.

Figure VIII represents a view of the image with the instrument adjusted to proper axis.

Figure IX represents a view of the image as seen when the instrument is properly adjusted for a sphero cylindrical lens.

In the drawings, the numeral 1 designates the base of a lens testing instrument to which our invention is applied, the form of instrument there illustrated being what is known in the trade as a lensometer. This instrument embodies a frame 2 having an eye piece section 3, a lens stage or supporting section 4, and an adjustable member 5 bearing the testing and power compensating means. This slide 5 has rotatably mounted thereon the sleeve 6 bearing exteriorly the protractor portion 7, and interiorly a supplemental sliding sleeve 8 bearing a target section 9. The sleeve itself also bears a second target member 10 in combination with a lens 11. This lens 11 is a cylindrical lens of such power that when the sleeves are set so that the instrument has no cylindrical corrective power the image of the target 10 will appear to exactly overlie the image of the target 9 as viewed through the eye piece portion 3, although the parts are actually in somewhat spaced relation.

The presence of this lens 11 is required since the target members 9 and 10 are formed from thin sheet metal and the actual images used in the lens testing are in the form of slots 12 cut in this metal, and it is necessary to have a lens to compensate for the thickness of the front member 9 in order to render the instrument of extreme accuracy and to give an absolutely sharp image of the cross slots. These parts form the prior art construction as at present used in commercially produced lensometers. It has been found, however, under some conditions difficulty may be experienced in the use of lens testing instruments of this type due to the fact that there are separate adjustments for the two target members to determine the power in the two meridians in the case of a lens having a cylindrical value and in the initial adjusting. If the axis of the target does not correspond with the axis of the cylinder, the image of the squares 13 formed by the cross slots 12 will appear blurred and irregular in outline, somewhat as indicated in Figure VII, and it is necessary to get the target set both to correct axis and also correct focal power in one meridian before the squares will tend to become sharp images along their parallel edges.

It is, therefore, the purpose of the present invention to provide means whereby the correct focus in one meridian may be quickly and readily obtained irrespective of the axial adjustment of the parts, thus facilitating the initial setting of the instrument for power in that meridian when the targets may then be readily rotated by grasping of the protractor wheel 7 to bring the target axis in alinement with the axis of the cylinder in the lens when it is in position for final adjustment to determine the power of the cylinder in the opposite meridian.

Our invention consists in the formation in the front target member or disc 9, in addition to the slot 12, of one or more circular apertures 14 disposed on a central line at right angles to the slot 12 of the member 9 so as to correspond with the central slot 12 of the member 10 and be illuminated therethrough. In use the slide 5 is shifted back and forth by rotation of the hand wheel 15 when the lens to be tested is in position on the stage 4 until the images 16 of the apertures 14 change from the blurred form shown in Figure VI to the elongated form shown in Figure VII, but with their lateral edges as at 17, sharp or clear cut. On account of the circular form of the apertures the edges 17 will show up clear cut irrespective of the relative position of the axes of the target and lens being tested when the instrument is adjusted to the proper power for one meridian of the cylinder. These elongated images 16 will then indicate the direction of axis of the cylinder in the lens being tested so that the target may be rotated to cause the squares 13 to lie along this axis, when the images 13 in place of a general blurred and indistinct form will assume the form shown in Figure VIII with their lateral edges 18 then clear and sharp. The instrument having been brought to this adjustment the supplemental control wheel 19 for the sleeve 8 is then adjusted to proper power in the opposite meridian when the images 13 will then assume the form of the squares shown in Figure IX. As this clearing up of the second side of the squares, however, is accomplished by relative adjustment of the positions of the targets 9 and 10, it will not serve to clear up the images 16, which will remain in the same form as they were at the preceding adjustment. These images, however, are no longer considered in the final determination of adjustments of the instrument as they have served their purpose, which is that of a finder by which the initial setting of the instrument may be accomplished as to focus and as an indicator of the direction in which the target should be rotated to properly align the axes of target and lens being tested. It will be understood that the great value of this finder is in connection with cylindrical lenses and in the case of spherical lenses it is merely necessary to shift up the whole instrument, when an image substantially as shown in Figure IV will be produced, the squares 13 and images 16 being then brought up at the same time.

It is to be understood that the images heretofore described are produced by projection of a light through the slots in the opaque metal discs, any desired form of illumination being employed. In order that the illumination may be at all times proper and constant, however, we prefer to mount in the outer end of the tube 8, a suitable bulb 20 which will cause the images to be properly projected from the target carrier through the lens 21 on the stage 4 being tested and in a manner to be readily visible at the eye piece 22 at the eye piece end 3 of the instrument.

We claim:

1. A target for a lens testing instrument including a pair of slotted plates having their slots extending at right angles one to the other, one of said plates having a circular finder aperture formed therethrough, substantially as and for the purpose described.

2. In a lens testing instrument, the combination with a target formed by a pair of plates having slots formed therein at right angles to each other whereby the resultant image is in the form of a plurality of alined squares, of a finder for the image, said finder being produced by forming an aperture in one of the plates in the form of a circle whereby a clear cut image of the sides of the circle will be produced irrespective of the relative angular position of the axis of the major target and the lens being tested.

3. In a lens testing instrument, the combination with a target formed by a pair of plates having slots formed therein at right angles to each other whereby the resultant image is in the form of a plurality of alined squares, of a finder for the image, said finder being produced by forming an aperture in one of the plates in the form of a circle whereby a clear cut image of the sides of the circle will be produced irrespective of the relative angular position of the axis of the major target and the lens being tested, said circular aperture being alined with one of the slots of the other target member whereby projected illumination through the slot will illuminate said aperture.

4. A target for a lens testing instrument including a pair of plates, one of the plates having a plurality of slots formed therein, the other of said plates having a slot therein arranged at right angles to the slots in the first plate, and having an aperture arranged on both sides of the said slot.

5. A target for a lens testing instrument including a pair of opaque members having elongated apertured portions therethrough, the apertured portions extending at an angle one to the other, one of said opaque members having an additional aperture therethrough substantially circular in form and adapted to operate as a finder.

BERNARD P. CURRIER.
EDGAR D. TILLYER.